United States Patent [19]
Rohde et al.

[11] 3,958,480
[45] May 25, 1976

[54] LONGITUDINAL SHEAR

[75] Inventors: Wolfgang Rohde, Hilchenbach-Dahlbruch; Friedrich Rotter, Kreuztal-Kredenbach; Adolf Müller, Hilchenbach-Allenbach, all of Germany

[73] Assignee: Schloemann-Siemag Aktiengesellschaft, Dusseldorf, Germany

[22] Filed: Aug. 5, 1974

[21] Appl. No.: 494,608

[30] Foreign Application Priority Data
Aug. 9, 1973 Germany............................ 2340273
Aug. 9, 1973 Germany............................ 2340340

[52] U.S. Cl.................................. 83/237; 83/255; 83/422; 83/517
[51] Int. Cl.² ..................... B23D 15/04; B23D 15/08
[58] Field of Search ............ 83/517, 8, 9, 156, 237, 83/255, 407, 422; 144/246 A, 246 D, 249 A; 198/127 R; 271/272, 273

[56] References Cited
UNITED STATES PATENTS

| | | | |
|---|---|---|---|
| 1,665,319 | 4/1928 | Mirfield | 83/156 |
| 1,788,574 | 1/1931 | Hagmaier et al. | 83/422 |
| 2,320,659 | 6/1943 | Sahlin | 83/422 |
| 3,555,951 | 1/1971 | Greis et al. | 83/255 X |
| 3,777,608 | 12/1973 | Kopf et al. | 83/517 |
| 3,871,258 | 3/1975 | Hurn | 83/422 X |

*Primary Examiner*—J. M. Meister
*Assistant Examiner*—Fred H. Silverberg
*Attorney, Agent, or Firm*—Norman S. Blodgett; Gerry A. Blodgett

[57] ABSTRACT

Longitudinal shear for rolled sheet metal, particularly heavy plate, which operates perpendicular to the plane of the sheet, whereby the sheet can be gradually divided into two parallel strips by the action of successive partial cuts of a certain length; the sheet is made to move forwardly intermittently by means of drivers located before and after the shears and at least during each cutting stroke kept from shifting by the action of at least one pair of holding rollers located across the cut line.

16 Claims, 5 Drawing Figures

LONGITUDINAL SHEAR

BACKGROUND OF THE INVENTION

In shearing lines, the oncoming sheets, especially thick plates, will be cut to a constant width by means of double trimming shears cutting along each side. Later the sheet can be split into two strips of more or less the same width by means of longitudinal shears. In order to accomplish this, the longitudinal shears can be shifted transversely of the sheet movement and can be locked firmly against the bed plate at each transverse adjustment point.

The longitudinal shears are equipped with two pairs of driving rollers at the inlet and outlet sides, one at each drive, one of which is secured in place, whereas the other can be made to move transversally to the movement of the sheet in correspondence to the different sheet widths. The separation between the inlet and outlet drivers is approximately 6 meters, the inlet driver introduces the front end of the sheet into the longitudinal shears and the shears start with the longitudinal cut of the sheet. As soon as the sheet front end reaches the outlet driver, the latter will close in such a way that the sheet will be driven by both drivers intermittently through the longitudinal shears and, while advancing, will be longitudinally cut. When the end of the sheet reaches the inlet driver, it opens, so that any further movement of the sheet will be accomplished only through the action of the outlet driver.

In the known longitudinal shears, not only the inlet driver but also the outlet driver is anchored to the base plate. The longitudinal shears are also movable transversally relative to the cut line over the base plate, so that it is adjustable independently of the drivers and can be driven over sheets of different widths.

In these knoown constructions of longitudinal shears there exists a rest force, during the longitudinal cut, which acts in addition to the shearing force and the chewing pressure. This rest force is transmitted, first from the sheet onto the driver aand then from the shears directly onto the base. This force is not exactly controlled and depends on the knife aperture, on the tensile strength of the sheet, and on the sheet thickness. Depending on the size, this force can produce a shifting of the longitudinal shears with respect to the sheet during the shearing effort, thus leading to inadmissible measurement errors on the finished sheets. Besides, there is also the disadvantage that, in cutting the sheets longitudinally, the cutting border at the beginning and end areas deviates from a straight line in an undesired manner; on the other hand, cutting border with good tolerance lies within the two end areas. It can be concluded that the deviations from the straight line occur on those areas where the sheet is guided by only one of the two drivers during the longitudinal cut. These inaccuracies stem from the fact that, in the case of sheets guided only from one side in the area of the longitudinal shears, the pressure exerted by the upper blade produces a shifting of the sheet in the direction out of the upper blade side, therefore, producing a separating cut which deviates from a straight line.

In order to avoid these unacceptable deviations, the longitudinal shears have been equipped with guide arms with vertically guided rollers which are located in the cutting area of the longitudinal shears, but lie before and after the latter. While working with cutting lines, however, when trimming double shears are located ahead of the longitudinal shears, the tolerances of the width of the sheet cannot be eliminated. The sheet has a characteristic elasticiity in its plane and still undesired lever-like conditions are presented. Thus, the addition of guiding arms has not conducted to any practical improvement.

Contrary to the above, a better working result was obtained in the end area of the sheet by the location of a pair of holding rollers in a separation of 3 to 4 meters approximately, behind the driver at the outlet side. A corresponding improvement of the working conditions should be obtainable through the installation of an equal holding roller pair before the driver at inlet side. It has been shown, however, that this kind of additional holding roller guiding does not give the same results for all sheet measurements. It has been found, on the contrary, that with thick and wide sheets the deviation of the cut from a straight line is in a sense satisfactory, whereas for thin, narrow sheets, the piece of sheet resulting from the longitudinal cut while being held by the driver and the holding roller pair, will be elastically deformed and impressed by the upper blade. In this case, in spite of the dual clamping, a deviation from a straight line is encountered.

The purpose of the invention is to eliminate these disadvantages. Thus, it is the purpose of the invention to produce a longitudinal shear, of the kind described at the beginning, such that, during the shearing work, a transverse shifting of the longitudinal shear cannot occur. In addition, accurate guiding of the sheet takes place independently of its dimensions or elasticity, so that at the beginning and end areas of the longitudinally-sheared sheet, a resulting straight lineal cut is assured.

SUMMARY OF THE INVENTION

In general, the solution to these complex problems consists, in accordance with the invention, first of all on drivers on one side which in conjunction with their mechanism and adjusting equipment, are located directly over the shear stand at the inlet and outlet sides and clamping roller pairs on the other side which are located alongside the blade area.

As a result of the mounting of both drivers directly on the shear stand, it is brought about that, in addition to the shearing force and chewing force originated during each longitudinal cut, a rest force will occur transversely of the direction of movement of the sheet and on several parts of the shear. The rest force acts in the area of the clamping rollers as pure traction on the sheet in such a way that the small elastic deformation produced thereby in the sheet is completely insignificant to produce any deviation of the borders of the cut from a straight line.

Because of the arrangement of clamping roller pairs near the blade area, it is necessary to take into account the total resulting horizontal force from the clamping rollers. Thus, it is expedient to lay out at this place, two or more pairs of clamping rollers one after the other in the direction of movement, while the contact pressure of a pair of holding rollers cannot be adjusted to be too high.

In accordance with the invention, there immediately exists the possibility of attaching the pair of holding rollers to the base plate. In this case, the horizontal force transmitted from the shearing blade to the sheet can be transmitted to the base plate at the same time that the reaction force passes to the base plate through the shears stand, the driving mechanism, and the brakes. Through incorrect functioning of the brakes, it would be possible for the shears to shift horizontally. It is suggested, therefore, as an especial advantage of the present invention that the pair of holding rollers be also suspended from the shears stand, so that in such case, both the action and reaction forces will be absorbed fully by the shear stands and, thus, not leading to the danger of an undesired displacement of the shears.

Another advantageous construction in this arrangement, in accordance with the invention, is that the pair of holding rollers are set at a constant lateral separation from the lower blade block.

In accordance with the invention, it has been found to be advantageous to place each holding roller of the pairs on transverse bars one end of which is so suspended from the shear stand that it can swivel and the other end of which is introduced into the shear stant in such a manner that it can either raised or lowered. It is further advantageous to arrange the shear so that, in accordance with other characteristics of the invention, the end of the traverse bar at the exit side is mounted so that it can swivel over the shear stand.

By equipping the clamping roller guide with two clamping roller pairs located one behind the other, it is especially convenient, in accordance with the invention, that the upper rollers on one side and the lower clamping rollers on the other side of both pairs of clamping rollers are mounted on common balancing members which are capable of rocking and which are suspended from each of the upper and lower transverse bars.

The clamping rollers of each pair of clamping rollers are thus especially mounted comparatively near to the cut line of the longitudinal shear, so that they are freely located in suspension on the balancing members.

Further, it can be advantageous, in accordance with the invention, if the upper and lower transverse bars are capable of being raised and lowered by a single driving mechanism, such as a pressure cylinder, and if both driving mechanisms can be operated simultaneously.

In accordance with a further construction characteristic of the invention, the driving rollers of the driver are mounted symmetrically of the cut line of the shearing blade and really loacted in its immediate vicinity. Thus, the advantage exists that the driver can work completely independently of the width of the uncut sheet, i.e., it is not necessary to adjust it for different sheet widths.

Another development consonant with the intention of the invention is that at the inlet side there is located one driver with a driving pair of rollers, whereas at the outlet side there is one driver with two driving roller pairs which are located separately but near each other and lateral of the cut line. It is advantageous if the total width of the driving rollers coincide; that is, the width of each single driving roller at the inlet side is twice as large as the width of a single driving roller of the outlet side.

A further distinctive characteristic of the longitudinal shear is that the driving rollers of the driver are supported in an overhung through joints on the shear stand, so that they can swivel. It is thus considered advantageous, if each driving roller is overhung on two hinges located side by side on the shear stand and a single adjustable excentric bolt is set in each hinge. It is thus always possible to effect an after-correction in the directional location of the driver, so that it is possible to adjust the guiding quality of the driver to the existing conditions without further action.

In accordance with the invention, each driving roller of the driver can be driven by an electric motor. In the case of the driver of the inlet side, it would be also conceivable to drive each driving roller by means of two electric motors located side-by-side.

Finally, there is also the distinctive characteristic that each driving roller can be adjusted by means of a single adjusting mechanism, particularly by a pressure cylinder.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
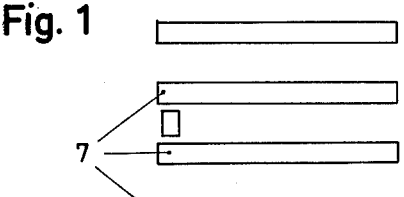
FIG. 1 is a schematic plan view of a heavy plate shear line for the trimming and longitudinal shearing of sheets including the longitudinal shear built in accordance with the invention.
Figure 1:
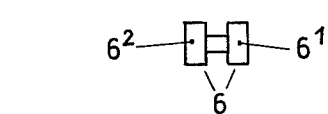
Figure 1:
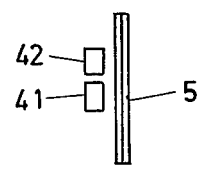
Figure 1:
Figure 1:
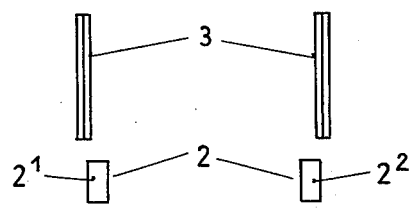
Figure 1:
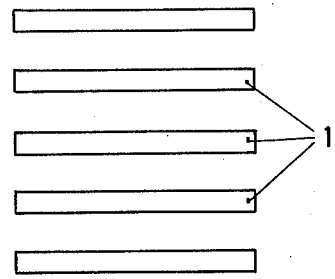

Referring first to FIG. 1 of the drawings, the shear line for heavy plate has a feeding roller set 1 on which the sheet or heavy plate arrives from the rolling process. The plate is fed into a driver 2 which grasps it and in stroking intermittently guides it into the trimming double shears 3. In the trimming double shears 3, the sheet trimmed along its longitudinal borders with successive cutting strokes which bring the sheet to a predetermined width.

The sheet which emerges from the trimming double shears is then grasped by a further driver 4 which moves the sheet into a longitudinal shear 5. In this shear the sheets are divided into two parallel strips of equal or unequal widths. These strips are then grasped at the exit by a driver 6 which slides the sheet onto a train of rollers 7 for the purpose of conveying it further.

From FIG. 1 it can be seen that the driver 2 consists of two pairs of rollers $2^1$ and $2^2$ which are located ahead of the double trimming shears 3 and which act in the vicinity of the longitudinal borders of the sheet which is to be trimmed. The driver 4 ahead to the longitudinal shear 5 consists on the other hand of only one pair of rollers which is located symetrically of the cut line of the longitudinal shear 5, that is the driving rollers with the half width are set on one side or the other of the longitudinal cut line.

The driver 6 which is located behind the longitudinal shears 5 consists of two pairs of driving rollers $6^1$ and $6^2$ which are located symmetrically of the longitudinal cut line in such a way that the pair of driving rollers $6^1$ are located on one side and the pair of driving rollers $6^2$ are located on the other side of the longitudinal cut line at a certain distance from the latter.

The total width of the driving rollers of both pairs of driving rollers $6^1$ and $6^2$ of the driver 6 is, thus, equal to the width of that of the pair of rollers at the driver 4.

Figure 4:
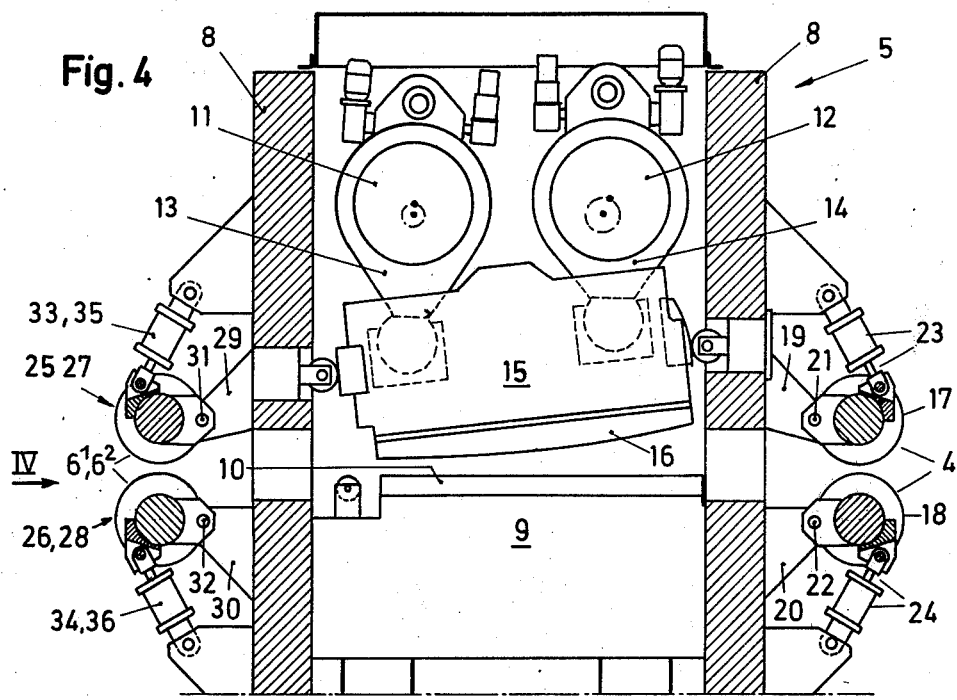
FIG. 4 is a longitudinal sectional view partially in section of the arrangement of the drivers in accordance with the invention in the heavy plate longitudinal shear.

In FIG. 4 of the drawings is clearly shown the longitudinal shear 5 along with the driver at the inlet side and the driver at the outlet side 6.

In the longitudinal shears 5, the shear stand 8 is conventionally equipped with an under-blade table 9 where the fixed, straight blade 10 stands. In the upper portion of the shear stand 8 are located two crank shafts 11 and 12, each equipped with a connecting rod 13 and 14. An upper blade holder 15 is continuously raised and lowered by these connecting rods, so that an arched upper blade 6 is moved relative to the fixed lower blade 10 in a rocking cutting movement.

For each cutting stroke of the upper blade 16 the sheet to be cut longitudinally is pushed into the longitudinal space 5 which corresponds roughly to the length of the blades 10 and 16. For this purpose, the driving rollers 17 and 18 are suspended at the entrance side of the shear stand 8 and belong to the pair of rollers of the driver 4, they are allowed to swivel parallel to their axis of rotation around bearings 21 located in brackets 19 and 20. For the adjustment of the driving rollers 17 and 18 relative to the sheet to be transported, two pressure cylinders 23 and 24 are provided which are supported, on one side from the shear stand 8 and on the other side to the bearing members of the rollers 17 and 18. Also the driver 6 at the exit side is similarly mounted on the shear stand 8.

As has been stated before, the driver 6 consists of two pairs of driving rollers $6^1$ and $6^2$ (FIG. 5) with the pair of driving rollers $6^1$ consisting of both driving rollers 25 and 26, while the pair of driving rollers $6^2$ has driving rollers 27 and 28.

Also, the driving rollers 25, 27, and 26, 28 of the driving pair $6^1$, $6^2$ are suspended from the brackets 29, 30 of the shear stand 8, so that they can swivel parallel to their rotation axes around bearings 31, 32. They are adjusted relative to the sheet to be transported by means of pressure cylinders 33, 35 and 34, 36 and pressure cylinders 33 through 36 which are supported on the shear stand 8.

Figure 3:
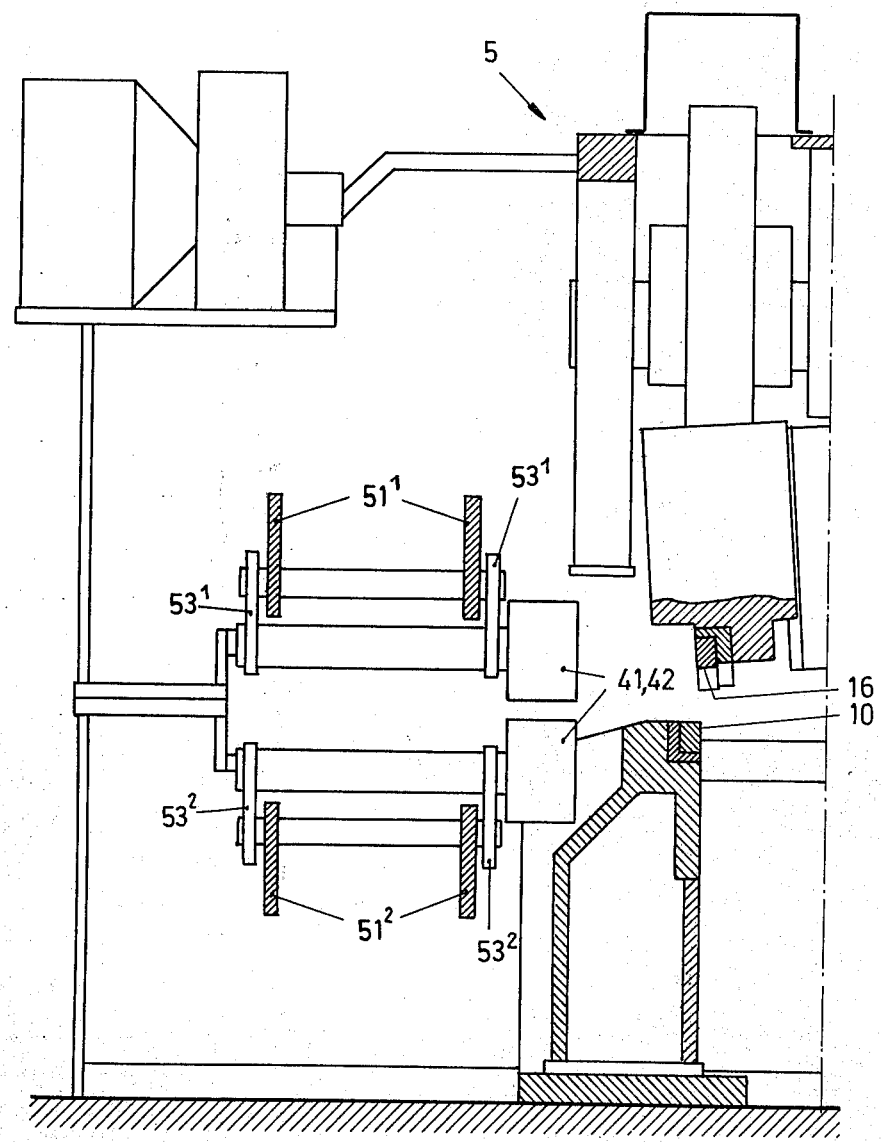
FIG. 3 is a transverse sectional view of the heavy plate longitudinal shear as seen in the direction of the movement of the sheet.

It can be clearly understood from FIG. 3 that both pairs of driving cylinders $6^1$ and $6^2$ of the driver 6 at the exit side can be adjusted to extend a given distance at both sides of the longitudinal cut line produced by the blades 10 and 16. By means of this arrangement it is assured that notches which are possible in longitudinal cutting cannot be impressed on the sheet by the rolling of rollers 25 through 28 of the pair of driving rollers $6^1$ and $6^2$.

Figure 5:
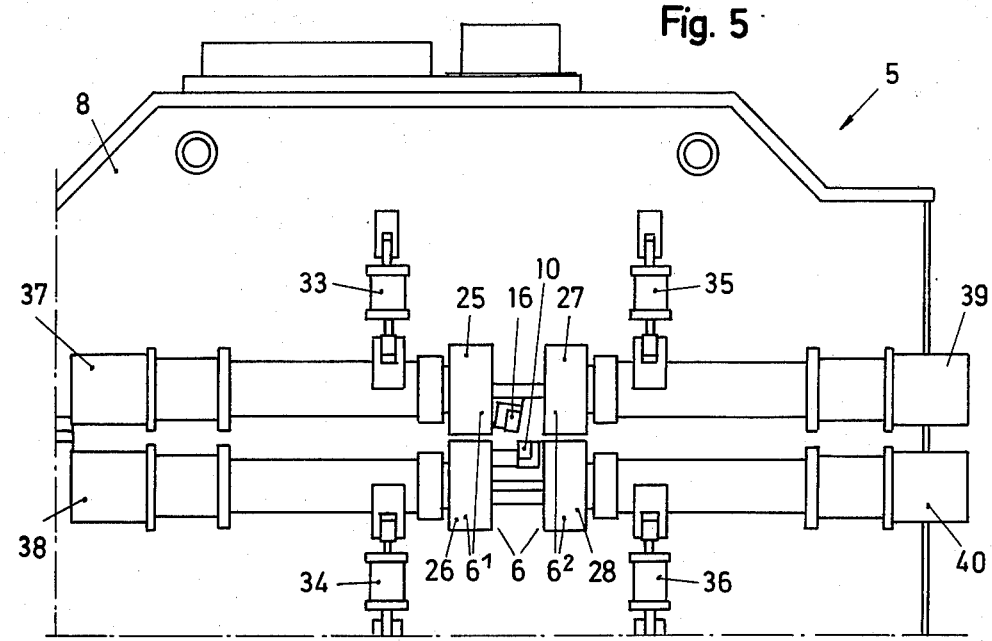
FIG. 5 is an end elevational view of the longitudinal shear seen in the direction IV of FIG. 4.

In FIG. 5 of the drawings it can be seen that each of the driving rollers 25 through 28 can be driven by a single electric motors 37 through 40. These electric motors 37 through 40 are directly coupled to the driving rollers 25 through 28 and are thus displaced together with the rollers about the axes of the bearings 31, 32 by the action of the pressure cylinders 33 through 36.

The operation of driving rollers 17 and 18 of the driver 4 at the inlet side can be arranged in a manner similar to that of the driving rollers of the driver 6 at the exit side. Each one of the drive rollers 16 and 18 is connected to is own drive motor. On the other hand, it is also conceivable that the driving rollers 17 and 18 of the driver 4 at the inlet side can be actuated by two motors, one at each side of the driving roller. This method presents a simplification for the system, inasmuch as all the motors for the drivers 4 and 6 can be arranged in the same manner. For each driving roller 17 and 18 of the inlet side driver there is available a dual motive force as is true for each one of the driving rollers of the exit side driver 6. Since in each case the inlet side driving rollers 17 and 18 are twice as wide as each driving roller of the exit side driver 6, the same driving force will then be available to the drivers 4 and 6, referring to the effective active areas.

It should be mentioned, however, that the joints 21, 22 or 31, 32 for the support of each driving roller on the shear stand 8 are shown in pairs and shown with single adjustable eccentric bolts. It is then possible that the shaft of the driving rollers can be regulated relative to the longitudinal cut line in a manner so delicate that the transportion of the sheet through the longitudinal shear 5 always occurs exactly parallel to the longitudinal cut line. Thus, the longitudinal cutting of the sheet can take place with very small tolerance deviations.

Two pairs of rollers 41 and 42 are shown in accordance with FIG. 1, so that an exact straight cut of the sheet can be secured along its entire length. These rollers are located adjuacent the blade area of the longitudinal shear and with their help the sheet can be firmly held against shifting during each stroke of the longitudinal shear.

Figure 2:
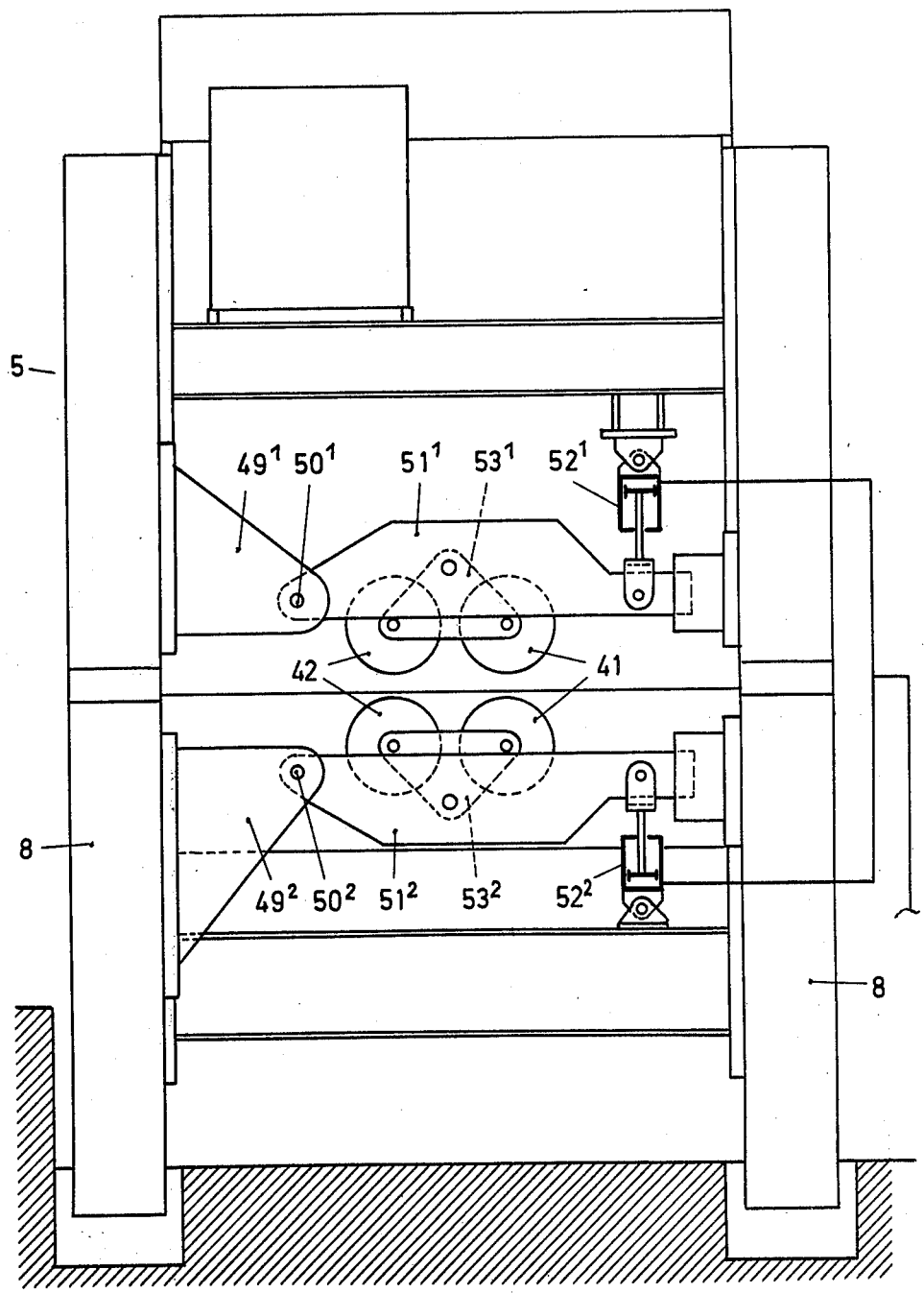
FIG. 2 is a side elevational view of a longitudinal shear for heavy plate with clamping rollers arranged in accordance with the invention.

The pair of holding rollers 41 and 42 can be directly anchored to the base plate so that the horizontal force generated during the shearing process can be directly taken by the base plate, while the reaction force will be directed to the base plate through the shear stand, its driving mechanism, and its brakes. In case the brakes do not function in a trouble free manner, it could be found that the shears have unintentionally shifted horizontally; thus, deviations from the theoretical dimensions would occur. To decrease this effect, the pairs of holding rollers 41 and 42 are arranged on the shear stand 8 as shown in FIGS. 2 and 3. By this arrangement of the pairs of rollers 41 and 42, the forces of action and reaction remain inside of the shear stand 8 and the danger of a misalignment of the shear 5 with respect to the base plate is avoided.

In accordance with FIGS. 2 and 3, at the exit side of the shear stand 8, brackets $49^1$ and $49^2$ are provided at the exit side of the shear stand 8 and on these are hung transverse members $51^1$ and $52^2$, so that they can swing at one end about bushings $50^1$ and $50^2$. The other end of these transverse members $51^1$ and $51^2$ can be raised or lowered at the entrance side of the shear stand 8 by driving mechanisms in the form of hydraulic cylinders $52^1$ and $52^2$. With the help of these cylinders, the longitudinal transverse members can swing as desired, toward or away from each other, in accordance with the manner in which both hydraulic cylinders are supplied with pressure medium.

From the upper longitudinal transverse membe $51^1$ hangs a balancing piece $53^1$. A pair of holding rollers 41 and 42 are mounted on the free ends of these balancing pieces $53^1$ and $53^2$ in such a way that both holding rollers of a pair of holding rollers 41 and 42 can move toward or away from each other. When the holding rollers of a pair of holding rollers 41 and 42 are pressed against the sheet located between them, the sheet is fixedly held against unintentional lateral shifting during the shearing process, so that in all parts of the sheet a totally straight cut is obtained.

FIG. 2 of the drawings clearly shows that the holding rollers of both holding roller pairs 41 and 42 are suspended by the balancing piece 53¹ and 53², so that they are located on the side of the lower blade of the longitudinal shear 5 near the cut line.

The construction of a longitudinal shear 5 in accordance with FIGS. 2 and 3 has the particular advantage that, in the longitudinal cutting of the whole length of the sheet; including the front end and rear end zones, a completely trouble free straight cut is obtained. This is entirely due, in the first place, to the fact that the holding-roller pairs are suspended directly on the shear stand; for this reason, they always act at the same distance from the cutting line of the sheet to be cut.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new desired to secure by letters patent is:

1. A shear for rolled sheet, comprising
   a. a housing having an entrance and an exit, the sheet moving longitudinally and horizontally through the housing from the entrance to the exit,
   b. a blade mounted in the housing and located longitudinally thereof, the blade being vertically movable in a plane perpendicular to the sheet to divide the sheet into two strips by means of successive partial cuts determined by the length of the blade,
   c. a pair of holding rollers mounted within the housing with their axes extending transversely to maintain the sheet in a fixed position during each cutting stroke, each roller being located closely adjacent the blade, the two holding rollers being located one behind the other in the direction of sheet movement, and
   d. a first driver with actuating and adjusting mechanisms mounted outside the housing adjacent the entrance, and
   e. a second driver with actuating and adjusting mechanisms mounted outside the housing adjacent the exit, characterized by the fact that an upper and a lower holding roller of the pair of molding rollers (41, 42) is each located on common balancing pieces (53¹, 53²) which are suspended from each transverse member (51¹, 52²), so that they are able to oscillate.

2. Longitudinal shear as recited in claim 1, characterized by the fact that the holding rollers are attached to the balancing pieces (53¹, 53²) in a free floating manner.

3. Longitudinal shear as recited in claim 1, characterized by the fact that at least one pair of holding rollers (41, 42) is suspended from the shear housing by supports (49¹ through 53¹ and 49² through 53²).

4. Longitudinal shear as recited in claim 1, characterized by the fact that at least one pair of holding rollers (41, 42) is arranged with constant sidewise separation adjacent a lower blade.

5. Longitudinal shear as recited in claim 1, characterized by the fact that each holding roller of the pair of holding rollers (41, 42) is located on transverse members (51¹, 51²), one end of which is suspended from the housing, so that it swivels (49¹, 49², 50¹, 50²) and the other end of which can be raised or lowered at the housing.

6. Longitudinal shear as recited in claim 5, characterized by the fact that the end of the transverse members (51¹, 51²) located at the exit is mounted so that it can swivel (50¹, 50²) at the housing.

7. Longitudinal shear as recited in claim 1, characterized by the fact that the upper and lower transverse members (51¹, 51²) can be raised or lowered by their own actuating mechanism (52¹, 52²).

8. Longitudinal shear as recited in claim 7, characterized by the fact that the actuating mechanisms (52¹, 52²) can be actuated in combination.

9. Longitudinal shear as recited in claim 1, characterized by the fact that the driving rollers (17, 18, 25, 26, and 27, 28) of the driver (4, 6) are symmetrically located and in the vicinity of the shearing blades (10, 16).

10. Longitudinal shear as recited in claim 1, characterized by the fact that a driver (4) with a pair of driving rollers is located at the entrance side, whereas at the exit side there is located a driver (6) with two pairs of driving rollers (6¹, 6²) separated from each other and at each side of the blade.

11. Longitudinal shear as recited in claim 1, characterized by the fact that the total width of the driving rollers (17, 18, 25, 26, 27, 28) at the entrance side (4) and at the exit side (6) is the same.

12. Longitudinal shear as recited in claim 1, characterized by the fact that the driving rollers (17, 18, 25, 26, 27, 28) of the driver (4, 6) are suspended from the housing and can oscillate on joints (21, 22, 31, 32).

13. Longitudinal shear as recited in claim 1, characterized by the fact that each driving roller (17, 18, 25, 26, 27, 28) is suspended on the housing means by two side by side located bushings (21, 22, 31, 32) and on each bushing there is located an adjustable single eccentric bolt.

14. Longitudinal shear as recited in claim 1, characterized by the fact that each driving roller (25, 26, 27, 28) is driven by its own electric motor (37, 38, 39, 40).

15. Longitudinal shear as recited in claim 1, characterized by the fact that each driving roller (17, 18) is driven by two electric motors that are mounted side-by-side.

16. Longitudinal shear as recited in claim 1, characterized by the fact that each driving roller (17, 18, 25, 26, 27, 28) is operated by a single adjusting device (23, 24, 33, 34, 35, 36).

* * * * *